United States Patent
Bendel et al.

(10) Patent No.: US 10,648,451 B2
(45) Date of Patent: May 12, 2020

(54) METHOD FOR MANUFACTURING A ROTOR BLADE OF A WIND POWER PLANT, ROTOR BLADE AND WIND POWER PLANT

(71) Applicant: Senvion GmbH, Hamburg (DE)

(72) Inventors: Urs Bendel, Fockbek (DE); Enno Eyb, Kiel (DE); Tilman Richers, Frankfurt am Main (DE); Christian Flach, Osterrönfeld (DE); Hendrik Mester, Kiel (DE)

(73) Assignee: Senvion GmbH, Hamburg (DE)

( * ) Notice: Subject to any disclaimer, the term of this patent is extended or adjusted under 35 U.S.C. 154(b) by 459 days.

(21) Appl. No.: 15/254,956

(22) Filed: Sep. 1, 2016

(65) Prior Publication Data
US 2016/0369772 A1 Dec. 22, 2016

Related U.S. Application Data

(63) Continuation of application No. PCT/EP2015/053976, filed on Feb. 26, 2015.

(30) Foreign Application Priority Data

Mar. 4, 2014 (DE) .......................... 10 2014 203 936

(51) Int. Cl.
*F03D 1/06* (2006.01)
*B29C 65/48* (2006.01)
(Continued)

(52) U.S. Cl.
CPC ............ *F03D 1/0675* (2013.01); *B29C 65/48* (2013.01); *B29C 66/1222* (2013.01);
(Continued)

(58) Field of Classification Search
CPC .... F03D 1/0675; F03D 1/0683; F03D 1/0691; F03D 1/065; F03D 1/0641
(Continued)

(56) References Cited

U.S. PATENT DOCUMENTS

| 8,092,187 B2* | 1/2012 | Bell | .......................... F03D 1/06 416/224 |
| 8,419,373 B1* | 4/2013 | Fukami | ................. F03D 1/0633 415/4.3 |
| 2012/0301293 A1* | 11/2012 | Bech | ....................... F03D 80/00 416/1 |

FOREIGN PATENT DOCUMENTS

| DE | 3014347 A1 | 10/1981 |
| DE | 102011050661 A1 | 11/2012 |

(Continued)

*Primary Examiner* — Ninh H. Nguyen
*Assistant Examiner* — Jason Mikus
(74) *Attorney, Agent, or Firm* — Rankin, Hill & Clark LLP

(57) ABSTRACT

A method for manufacturing a rotor blade of a wind power plant which has an area close to the blade root in which the rotor blade has an obtuse rear edge. The method includes manufacturing a half-shell on the pressure side and a half-shell on the suction side, introducing and adhesively bonding filler bodies into at least one section of the area of the obtuse rear edge of the pressure-side half-shell and the suction-side half-shell, wherein the sections with the filler bodies lie opposite one another in the assembled rotor blade, assembling and positioning the half-shells relative to one another, wherein an adhesive gap which is delimited by the first adhesive surfaces of the filler bodies remains between the filler bodies, and introducing an adhesive medium into the adhesive gap. Also a rotor blade manufactured according to the method, and a wind power plant including such a rotor blade.

13 Claims, 2 Drawing Sheets

(51) Int. Cl.
  *B29C 65/00*      (2006.01)
  *B29L 31/08*      (2006.01)
  *B29C 65/50*      (2006.01)
  *B29K 105/20*    (2006.01)
  *B29C 65/54*      (2006.01)

(52) U.S. Cl.
  CPC ...... *B29C 66/1224* (2013.01); *B29C 66/5326* (2013.01); *B29C 66/54* (2013.01); *B29C 66/61* (2013.01); *B29C 66/721* (2013.01); *B29C 66/727* (2013.01); *B29C 65/5014* (2013.01); *B29C 65/5042* (2013.01); *B29C 65/54* (2013.01); *B29C 66/1122* (2013.01); *B29C 66/1142* (2013.01); *B29C 66/131* (2013.01); *B29C 66/301* (2013.01); *B29C 66/3242* (2013.01); *B29C 66/532* (2013.01); *B29C 66/7487* (2013.01); *B29K 2105/20* (2013.01); *B29L 2031/085* (2013.01); *F05B 2280/6014* (2013.01); *Y02E 10/721* (2013.01); *Y02P 70/523* (2015.11)

(58) Field of Classification Search
  USPC ...................................................... 416/229 R
  See application file for complete search history.

(56) References Cited

FOREIGN PATENT DOCUMENTS

| | | | | |
|---|---|---|---|---|
| DE | 102012012298 | A1 | 12/2013 | |
| EP | 0037987 | A2 * | 10/1981 | ............. B29C 44/12 |
| EP | 0037987 | A2 | 10/1981 | |
| WO | 2010048370 | A1 | 4/2010 | |
| WO | WO-2013063760 | A1 * | 5/2013 | |

* cited by examiner a)

b)

c)

METHOD FOR MANUFACTURING A ROTOR BLADE OF A WIND POWER PLANT, ROTOR BLADE AND WIND POWER PLANT

CROSS-REFERENCE TO RELATED APPLICATIONS

This application is a continuation of PCT/EP2015/053976, filed Feb. 26, 2015, and claims priority to DE 10 2014 203 936.3, filed Mar. 4, 2014.

BACKGROUND OF INVENTION

Field of Invention

The invention relates to a method for manufacturing a rotor blade of a wind power plant which has a region close to a blade root in which the rotor blade has an obtuse rear edge, as well as to a corresponding rotor blade and a wind power plant.

Brief Description of Related Art

Rotor blades of modern wind power plants have lengths of more than 50 m. In many cases for their manufacture first two half-shells are each made from a plurality of layers of a fiber-reinforced composite material in which the supporting structures such as spar boxes, rotor blade girders, webs or the like are incorporated. The half-shells are then fitted together and adhesively bonded together along their abutting edge.

Many rotor blades have in a region close to the blade root a so-called cut-off rotor blade profile with an obtuse profiled rear edge. This rear edge is also called an end web. In some cases the end web is made as a prefabricated member and in a separate method step is introduced and adhesively bonded into the gap between the upper and the lower half-shell.

Alternatively the end web can also be formed and manufactured together with the respective half-shell. In this case an adhesive gap is produced in the end web in the transition area with the solid profile having an acute profiled rear edge and the gap width can only be controlled with difficulty. Very wide adhesive gaps are produced in the highly stressed region close to the root and these have a tendency to produce cracks during use. In order to prevent this, labor-intensive laminating is carried out in the transition area in order to meet the requirements for an adhesive gap of no more than 10 to 30 mm.

BRIEF SUMMARY OF THE INVENTION

Proceeding from here the object of the present invention is to improve the stability of rotor blades in the region of the obtuse rear edge and the transition with the solid profile.

This is achieved by a method for manufacturing a rotor blade of a wind power plant, which has a region close to the blade root in which the rotor blade has an obtuse rear edge, with the following method steps:
  manufacturing a half-shell on the pressure side and a half-shell on the suction side;
  introducing and adhesively bonding filler bodies in each at least one section of the region of the obtuse rear edge of the pressure-side half-shell and the suction-side half-shell wherein the sections with the filler bodies lie opposite one another in the assembled rotor blade;
  assembling and positioning the half-shells relative to one another wherein an adhesive gap remains between the filler bodies and is delimited by first adhesive faces of the filler bodies; and
  introducing an adhesive medium into the adhesive gap.

Other conventional method steps such as manufacturing and introducing a spar box, rotor blade girders and webs or other supporting or retaining structures, removal from the shell molds etc., remain unaffected here.

The invention is based on the basic idea of carrying out the adhesion in the transition region of the blade from the area with the cut-off profiles into the area with normal profiles in such a way that a defined adhesive gap is produced overall. For this purpose by using the filler bodies a defined and easily controllable adhesive gap is produced which furthermore offers a larger adhesive surface area and thus a better adhesion of the half-shells in this area. The filler bodies, also called "center boards", form a transition from the end web into the normal shell adhesion.

In an advantageous further development, before introducing an adhesive medium into the adhesive gap, a single or multi-part flat closure body is incorporated at the inner, in relation to the rotor blade, second adhesive surfaces of the two filler bodies in order to close the adhesive gap. The flat adhesion of the closure body with the filler bodies ensures that the adhesive gap is sealed off and thus no excess adhesive medium can be discharged into the adhesive gap which would run into the inside of the rotor blade. Furthermore the flat adhesively-bonded closure body strengthens the adhesion of the filler bodies and thus of the half-shells with one another.

More advantageously the closure body is fixed on a filler body before the half-shells are fitted together, thus in particular is fixed on the filler body in the lower half-shell during assembly. After assembly the closure body then need only be adhesively bonded to the other, more particularly upper, half-shell. For this during adhesion the closure body is more advantageously placed and/or pressed against the or each filler body by cables and/or cords wherein the cables and/or cords are in particular cut off or removed after adhesion has occurred.

To adapt to the path of the rotor blade profile more advantageously at least one filler body has several sections with different cross-sections and/or cross-sectional contours. These cross-sections are defined transversely to the longitudinal extension of the rotor blade. A cross-sectional contour refers to the path of the cross-section in the direction of the longitudinal extension of the rotor blade. The cross-sections or cross-sectional contours are adapted to the rotor blade contour and have at least one part adjoining the end web which has a preferably planar first adhesive surface area for the adhesive gap.

Likewise more advantageously at least one filler body is or will be assembled from several part-bodies. This makes it easier to handle the filler body and to introduce same into the corresponding half-shell.

The second adhesive surfaces preferably run at least in some sections inclined to the first adhesive surfaces. For this a further cross-sectional part is preferably provided which has the inclined second adhesive surface which reaches to the inside of the shell. The inclined second adhesive surface can adjoin the first adhesive surface, but it can also end in some sections just beneath the first adhesive surface so that the second adhesive surface is divided in two.

In an advantageous design of the invention the filler bodies are formed elastic and solid, more particularly are made from balsa wood, foam material or a fiber-reinforced composite material. This method of construction allows a lightweight but stable adhesive connection between the half-shells in the transition area from the obtuse rear edge to the solid profile.

The closure body preferably comprises a fiber-reinforced plastic. The fibers are preferably aligned transversely to the longitudinal extension of the rotor blade. This design enables a particularly stable and mechanically resistant connection of the filler bodies with one another. The closure body can also extend over the second adhesive surfaces and be adhesively bonded to an inner side of the blade shell whereby the connection between the filler bodies and blade shell is advantageously further strengthened.

A particularly stable adhesion is preferably produced when the closure body has at least in some sections a "V"-shaped cross-section and/or at least in some sections an obtuse "V"-shaped cross-section, in particular adapted to the second adhesive surfaces of the filler bodies.

The problem on which the invention is based is also solved by a rotor blade of a wind power plant having an obtuse profiled rear edge in an area close to the blade root, which is manufactured in a method previously described according to the invention, with filler bodies in at least one section of the obtuse rear edge on the suction-side half-shell and the pressure-side blade shell as well as a closure body by means of which an adhesive gap between the filler bodies is sealed off, as well as by a wind power plant having at least one corresponding rotor blade according to the invention.

The features, properties and advantages mentioned in respect of the method according to the invention also apply correspondingly for the rotor blade according to the invention and the wind power plant.

Further features of the invention will be apparent from the description of embodiments according to the invention together with the claims and the accompanying drawings. Embodiments according to the invention can comprise individual features or a combination of several features.

BRIEF DESCRIPTION OF THE DRAWINGS

The invention will now be described below without restricting the general idea of the invention using exemplary embodiments and with reference to the drawings wherein as regards individual details according to the invention which are not explained in further detail in the text, reference is made expressly to the drawings. In the drawings.

In the drawings the same or similar elements and/or parts are provided with the same reference numerals so that repeated explanations will not be given.

DETAILED DESCRIPTION OF THE INVENTION

Figure 1:
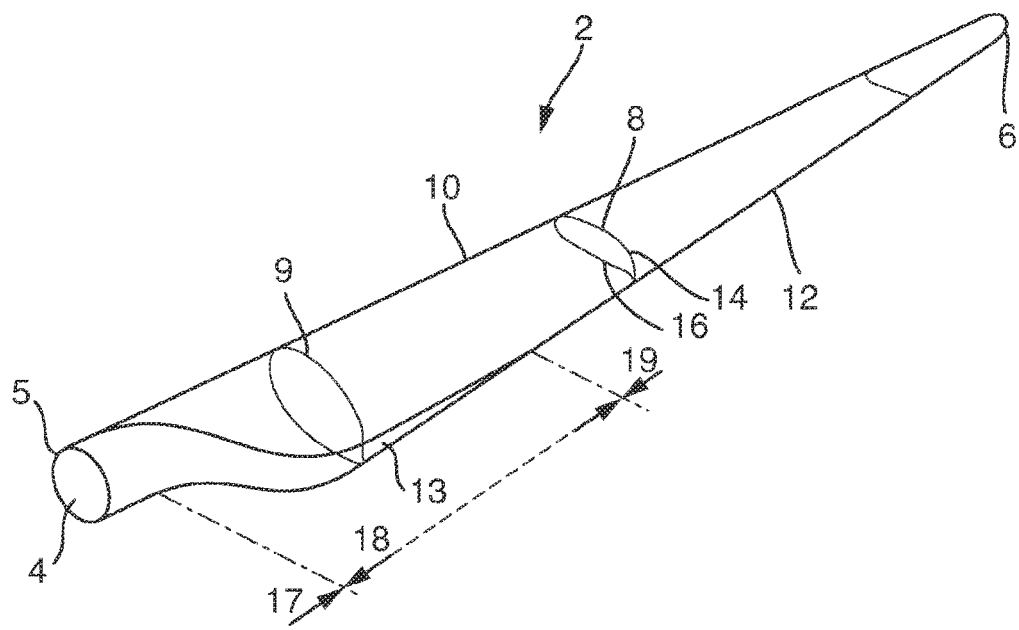
FIG. 1 shows a perspective view of a rotor blade.

FIG. 1 shows in a diagrammatic perspective view a rotor blade 2 of a wind power plant. The rotor blade 2 has a longitudinal extension from a rotor blade root 4 with a rounded cross-section to a rotor blade tip 6. Its profile has in its longitudinal extension a plurality of aerodynamic cross-sectional profiles 8, 9, some of which are shown as cross-sectional shapes. Thus in the central area, the so-called solid profile area 19 in this connection, an aerodynamic cross-sectional profile 8 is shown in the form of a solid profile which extends from a profile front edge 10 to a profile rear edge 12 and has a suction side 14 and a pressure side 16.

In a transition area 18 closer to the root the profiled rear edge 12 is cut off and changes into an obtuse rear edge 13 having an end web which widens out toward the blade root 4 and finally changes in the cylindrical area 17 into the rounded cross-section 5 of the rotor blade root 4. In the transition area 18 with the obtuse rear edge an obtuse aerodynamic cross-sectional profile 9 is shown which has a greater relative thickness than the aerodynamic cross-sectional profile 8 in the central area of the rotor blade wherein the relative thickness is defined as a ratio of the thickness to the chord length from the profiled front edge 10 to the profiled rear edge 12.

Figure 2:
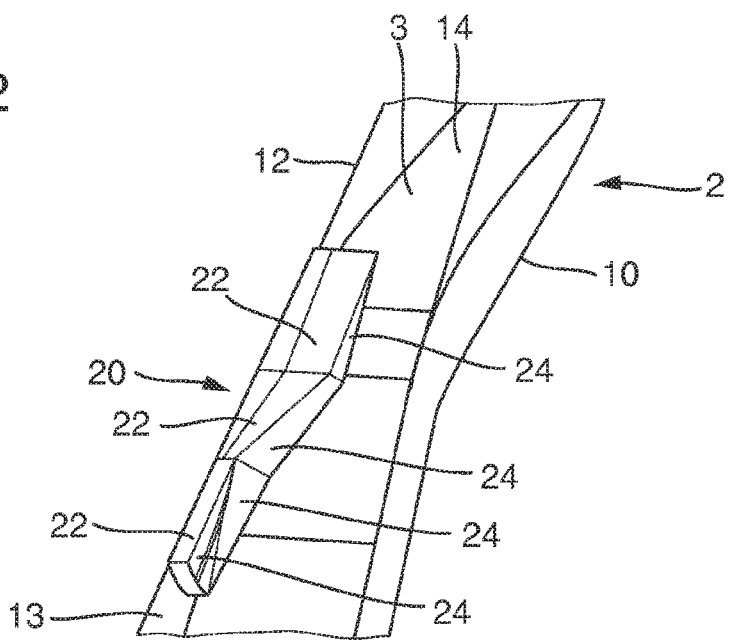
FIG. 2 shows a perspective view of a rotor blade half-shell with a filler body according to the invention.

FIG. 2 shows a part or a section of an inner side of a rotor blade half-shell 3 in a diagrammatic perspective view. It runs downward toward the rotor blade root, and upward toward the rotor blade tip. The transition area from the cut-off profile to the solid profile is shown. The obtuse rear edge 13 can be seen on the left lower side. The obtuse rear edge 13 becomes narrower toward the tip, thus upward in the illustration. In this area a filler body 20 is introduced which bears against the obtuse rear edge 13. The filler body 20 has several sections in the longitudinal direction of the rotor blade wherein first a narrow section with a substantially rectangular profile and having a first adhesive surface 22 on its upper side, is arranged close to the root. This first adhesive surface 22 serves for adhering to the other half-shell at the adhesive gap. Its inner side face forms together with a triangular rising inclined profile a second adhesive surface 24 for a closure body, which is not shown in FIG. 2.

The first adhesive surface 22 widens out toward the rotor blade tip, but the profile height decreases corresponding to the decreasing height of the obtuse rear edge 13 or end web. This continues in a third section in which the height of the filler body 20 decreases further toward its end.

Figure 3:
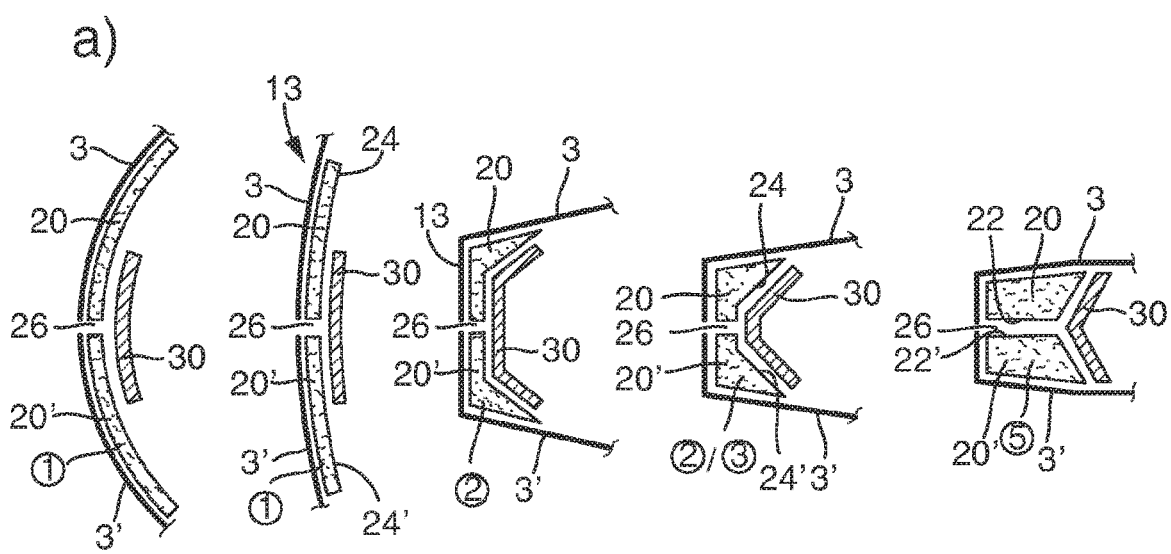
FIGS. 3a)-c) show illustrations of a filler body according to the invention and its introduction into a rotor blade.
Figure 3:
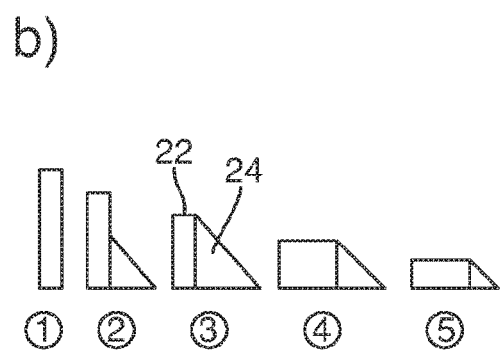
Figure 3:
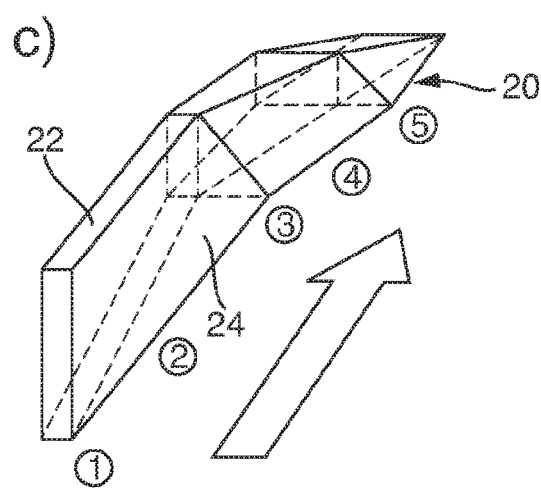

FIG. 3 shows different views of the structures according to the invention (diagrammatic illustrations) in the sub-figures a), b) and c). Thus FIG. 3c) shows a perspective view of the filler body 20, substantially corresponding to the embodiment according to FIG. 2. This filler body 20 is comprised of several part-bodies which have regular geometric structures and are adapted to the internal contour and configuration of the corresponding rotor blade. Thus close to the blade root in the area of the position which is marked by the circled 1 there is a substantially rectangular profile. A triangular profile starts in the longitudinal path a short time later and increases to a position 3 up to the full height of the substantially rectangular body. The first adhesive surface 22 thus runs substantially flat, whilst the second adhesive surface 24 has in this section two sub-surfaces between the position 1 and the position 3. In the section between position 3 and position 5 the cross-sectional contour of the substantially rectangular body and the substantially triangular body, which each define the first adhesive surface 22 and the second adhesive surface 24, changes in the longitudinal direction of the filler body 20. The height of the filler body 20 then decreases in the longitudinal path but the rectangular cross-section widens out. In the area on the other side of the position 5 the height of the two part-bodies decreases further until zero at its end. There is thus formed a rectangular and a triangular cross-sectional ramp.

FIG. 3b) shows the respective cross-sections for the said points along the longitudinal path from the position 1 to the position 5.

FIG. 3a) shows the arrangement in the assembled rotor blade for the said cross-sectional points in the circles wherein the half-shells 3 and 3' have been assembled together into a rotor blade. These relate to the rear edge. On the left the round circular blade root area is shown in section in which both the filler bodies 20, 20' follow the circular curvature and also the closure body 30. An adhesive gap 26 is formed between the filler bodies 20, 20' and the closure body 30.

In the second illustration from the left, which is likewise marked by an encircled 1 as the position marking, the round rotor blade profile runs gradually into the obtuse rear edge. The structural components and reference numerals are the same as in the left illustration. This continues in the further illustrations.

In the next view, the middle one of FIG. 3a), the obtuse rear edge profile has now been completely formed. The filler bodies 20, 20' now have an "L"-shaped cross-sectional profile. The closure body 30 is adapted to this and has a trough shape or an obtuse "V"-shape.

In the further illustration, the second from the right in FIG. 3a), the long arm of the "L"-shaped profile has been shortened. The base of the closure body 30 is likewise shortened.

In the right illustration of FIG. 3a), the position 5 is reached at which a trapezoidal profile of the filler bodies 20, 20' is now obtained. The closure body 30 now has a "V"-shaped profile accordingly.

The closure bodies 30 can also be laminated or adhesively bonded onto the inside of the half-shells 3, 3'. This produces a flat connection between the half-shells 3, 3' and the rotor blade rear edge 13 which is also inter alia essentially free of interruptions through the use of the closure body 30.

All the said features and also those which can only be derived from the drawings as well as individual features which are disclosed in combination with other features, are to be regarded alone and in combination as being essential to the invention. Embodiments according to the invention can be achieved by individual features or a combination of several features. Features which are designated "in particular" or "preferably" are also to be regarded as optional features within the scope of the invention.

REFERENCE NUMERAL LIST

2 Rotor blade
3, 3' Half-shell
4 Rotor blade root
5 Round profile
6 Rotor blade tip
8 Aerodynamic solid profile
9 Obtuse aerodynamic cross-sectional profile
10 Profiled front edge
12 Profiled rear edge
13 Obtuse rear edge
14 Suction side
16 Pressure side
17 Cylindrical region
18 Transition region
19 Solid profile region
20, 20' Filler body
22, 22' First adhesive surface
24, 24' Second adhesive surface
26 Adhesive gap
30 Closure body

What is claimed is:

1. A method for manufacturing a rotor blade of a wind power plant which has an area close to a blade root in which the rotor blade has an obtuse rear edge, said method comprising:
    manufacturing a pressure-side half-shell and a suction-side half-shell, each of said half-shells forming a part of the obtuse rear edge in the area close to the blade root;
    introducing and adhesively bonding a pressure-side filler body into at least one section of the area of the obtuse rear edge of the pressure-side half-shell and introducing and adhesively bonding a suction-side filler body into at least one section of the area of the obtuse rear edge of the suction-side half-shell, wherein the filler bodies bear against the obtuse rear edge of the pressure-side half-shell and the obtuse rear edge of the suction-side half shell, respectively;
    positioning the half-shells relative to one another such that sections of the area of the obtuse rear edge of the half-shells to which the filler bodies are adhesively bonded lie opposite one another and such that an adhesive gap, which is delimited in part by first adhesive surfaces of the filler bodies, remains between the filler bodies after the half-shells have been positioned relative to one another;
    attaching a single or multi-part closure body to inner, in relation to the rotor blade, second adhesive surfaces of both filler bodies to seal off the adhesive gap with respect to an inside of the rotor blade, the second adhesive surfaces differing from the first adhesive surfaces; and
    after the single or multi-part closure body has been attached to the inner second adhesive surfaces of both filler bodies to seal off the adhesive gap with respect to an inside of the rotor blade, introducing an adhesive medium into the adhesive gap between the filler bodies in contact with the first adhesive surfaces of the filler bodies.

2. The method according to claim 1, wherein the closure body is fixed on at least one of the filler bodies prior to assembling the half-shells.

3. The method according to claim 2, wherein the closure body is fixed on the filler body in the lower half-shell during assembly.

4. The method according to claim 1, wherein at least one filler body has a plurality of sections with different cross-sections.

5. The method according to claim 4, wherein at least one filler body is comprised of a plurality of part-bodies.

6. The method according to claim 1, wherein the second adhesive surfaces run at least in some sections inclined to the first adhesive surfaces.

7. The method according to claim 1, wherein the filler bodies are formed of an elastic and solid material.

8. The method according to claim 7, wherein the solid material is selected from the group consisting of balsa wood, foam and a fiber-reinforced composite.

9. The method according to claim 1, wherein the closure body is made from a fiber-reinforced plastic material.

10. The method according to claim 1, wherein the closure body has, at least in some sections, a "V"-shaped cross-section and/or has, at least in some sections, an obtuse "V"-shaped cross-section.

11. The method according to claim 10, wherein the cross-section of the closure body is adapted to the second adhesive surfaces of the filler bodies.

12. A rotor blade of a wind power plant having an obtuse profiled rear edge in an area close to a blade root, wherein said rotor blade is manufactured according to a method as claimed in claim 1 and includes filler bodies in at least one section of the obtuse profiled rear edge on the suction-side half-shell and the pressure-side half-shell.

13. A wind power plant having at least one rotor blade according to claim 12.

* * * * *